(12) United States Patent
Moser, Jr. et al.

(10) Patent No.: US 8,778,103 B2
(45) Date of Patent: Jul. 15, 2014

(54) ENERGETIC COMPOSITIONS INCLUDING NITRATE ESTERS AND ARTICLES INCLUDING SUCH ENERGETIC COMPOSITIONS

(75) Inventors: John R. Moser, Jr., Salt Lake City, UT (US); Richard L. Raun, Lindon, UT (US); David D. Shaw, Bountiful, UT (US)

(73) Assignee: Alliant Techsystems Inc., Arlington, VA (US)

( * ) Notice: Subject to any disclaimer, the term of this patent is extended or adjusted under 35 U.S.C. 154(b) by 25 days.

(21) Appl. No.: 13/225,159

(22) Filed: Sep. 2, 2011

(65) Prior Publication Data
US 2013/0055918 A1    Mar. 7, 2013

(51) Int. Cl.
*C06B 45/00* (2006.01)
*C06B 25/00* (2006.01)
*C06B 25/34* (2006.01)
*D03D 23/00* (2006.01)
*D03D 43/00* (2006.01)

(52) U.S. Cl.
USPC ............. 149/2; 149/88; 149/92; 149/109.2; 149/109.4

(58) Field of Classification Search
USPC ............. 149/2, 88, 92, 109.2, 109.4
See application file for complete search history.

(56) References Cited

U.S. PATENT DOCUMENTS

| | | | |
|---|---|---|---|
| 2,674,526 A * | 4/1954 | Reinhart | 149/3 |
| 5,026,443 A | 6/1991 | Muller et al. | |
| 5,387,295 A | 2/1995 | Gibson | |
| 5,398,612 A | 3/1995 | Graham et al. | |
| 6,607,617 B1 | 8/2003 | Hughes et al. | |
| 6,835,255 B2 | 12/2004 | Moser, Jr. | |
| 6,863,751 B1 | 3/2005 | Chan et al. | |
| 6,872,266 B1 | 3/2005 | Ciaramitaro | |
| 6,878,221 B1 * | 4/2005 | Mei et al. | 149/41 |
| 6,913,661 B2 | 7/2005 | Fleming et al. | |
| 2002/0190510 A1 * | 12/2002 | Yamazaki | 280/736 |
| 2005/0178484 A1 * | 8/2005 | Kohler | 149/23 |
| 2009/0114319 A1 * | 5/2009 | Jebrail et al. | 149/3 |

OTHER PUBLICATIONS

Department of the Army Technical Manual, Military Explosives (TM 9-1300-214), Chapter 9, Sep. 1984, 18 pages.
Meyer, Explosives, 5th ed., Nitroglycerine, © Wiley-VCH Verlag GmbH, Wenheim, 2002, pp. 226-228.
Dept. of the Army Technical Manual, Military Explosives (TM 9-1300-214), Sep. 1984, Cover Sheet and p. 9-11, downloaded from http://www.everyspec.com.

* cited by examiner

*Primary Examiner* — James McDonough
(74) *Attorney, Agent, or Firm* — TraskBritt

(57) ABSTRACT

Methods of forming energetic compositions include forming a premix comprising a nitrate ester, a polymer, and a stabilizer, and combining solids with the premix. Additional stabilizer may be added with the solids and may remain in a crystalline state. Some methods include dissolving a stabilizer in at least one of a plurality of nitrate esters. Energetic compositions include a continuous matrix and a stabilizer. The continuous matrix includes a nitrate ester and surrounds a solid energetic material. Some compositions include a first nitrate ester, a second nitrate ester having a decomposition rate lower than the first nitrate ester, and a stabilizer. An article includes a housing and an energetic composition in the housing.

22 Claims, 6 Drawing Sheets

ENERGETIC COMPOSITIONS INCLUDING NITRATE ESTERS AND ARTICLES INCLUDING SUCH ENERGETIC COMPOSITIONS

TECHNICAL FIELD

Embodiments of the present disclosure relate to energetic compositions including nitrate esters, methods of forming such energetic compositions and apparatus including such energetic compositions. Energetic compositions of embodiments of the present disclosure exhibit increased stability compared to conventional nitrate ester compositions.

BACKGROUND

Nitrate esters are commonly used in energetic formulations, such as smokeless powders, nitrate ester plasticized polyether (NEPE) propellants, and double base propellants. Nitrate esters are chemically unstable, decomposing slowly in a homolytic reaction. Byproducts of the homolytic reaction can catalyze further decomposition of the nitrate ester and damage a binder system in the energetic formulation if the byproducts accumulate.

To prevent autocatalysis, stabilizers are conventionally added to nitrate ester compositions. Such stabilizers include resorcinol, 2-nitrodiphenyl amine (2-NDPA), and N-methyl-4-nitroaniline (MNA). The stabilizer may limit or prevent autocatalysis by scavenging the byproducts of the homolytic reaction of the nitrate esters, thus controlling the overall decomposition rate. Over time, the concentration of a stabilizer in a nitrate ester composition may decrease as the nitrate ester decomposes. The stabilizer is added during manufacture in a quantity sufficient to preserve the physical and chemical integrity of the composition for the expected lifetime (shelf life or storage life) of the composition. In some applications, propellants may have an expected lifetime of several decades. Because the presence of crystallized stabilizer can adversely affect physical properties of the propellant, the stabilizer concentration at the time of manufacture is sufficiently low that the stabilizer remains solvated in the binder. Furthermore, use of stabilizers may be limited to only the amounts necessary to control decomposition of the nitrate ester. For example, a propellant may include about 0.5% stabilizer by weight at the time of production. The stabilizer concentration may gradually decrease during the lifetime of the propellant at a rate dependent upon storage conditions (e.g., temperature (including temperature cycling), humidity, vibration, etc.).

Contact with incompatible materials may accelerate the decomposition rate of nitrate ester compositions. This accelerated decomposition may significantly reduce the useful lifetime of nitrate ester propellants. For example, foreign object debris (FOD) can include materials of unknown composition in NEPE propellant mixes and finished rocket motors including such mixes. Procedures may be implemented to reduce contamination with FOD, such as FOD zones (i.e., areas where objects such as tools, packaging material, and debris are carefully tracked), ingredient screening, etc., but FOD remains an inherent risk of manufacturing. One partial solution to problems with FOD in nitrate ester compositions is to reformulate the compositions to make them more stable when placed in contact with materials likely to be FOD. That is, improving the resistance of nitrate ester compositions to FOD will reduce the decomposition rates of such compositions. Compatibility screening with ingredients (i.e., the ingredients purposefully added to propellants and motors) may also improve the stability of nitrate ester compositions. Nitrate ester compositions with higher stabilities may have longer useful lifetimes when exposed to incompatible materials.

NEPE propellants are conventionally formed by preparing a homogeneous liquid premix of nitroglycerin, polyethylene glycol (PEG), and MNA. The premix may be prepared separately and stored, if so desired. Solids, such as HMX, aluminum, ammonium perchlorate (AP), etc., are mixed with the premix to form a heterogeneous suspension or slurry. Curatives, generally including an isocyanate and a catalyst, are added to the suspension, and the propellant is cast and cured. Once cured, the propellant may have oxidizer crystals and powdered fuel held together in a rigid matrix of cross-linked binder.

BRIEF SUMMARY

Some embodiments of the present disclosure include methods of forming energetic compositions. The methods comprise forming a premix comprising a nitrate ester, a polymer, and a stabilizer dissolved in the nitrate ester. Solids comprising an energetic material and an additional amount of the stabilizer are combined with the premix. A portion of the stabilizer remains in a crystalline state after the combining.

In other embodiments, methods of forming an energetic composition comprise dissolving a stabilizer in at least one of a plurality of nitrate esters to form a premix. Each of the plurality of nitrate esters is independently selected from the group consisting of nitroglycerin, 1,2,4-butanetriol trinitrate, pentaerythritol tetranitrate, ethylene glycol dinitrate, diethylene glycol dinitrate, diglycerol tetranitrate, 1,2-propanediol dinitrate, trimethylolethane trinitrate, butyl-nitratoethylnitramine, triethyleneglycol dinitrate, and poly(glycidyl nitrate). Solids are combined with the premix.

In yet other embodiments, energetic compositions comprise a continuous matrix and a stabilizer. The continuous matrix comprises a nitrate ester and surrounds a solid energetic material. A portion of the stabilizer is dissolved in the continuous matrix and another portion of the stabilizer is in a crystalline state.

In certain embodiments, an energetic composition comprises a first nitrate ester, a second nitrate ester having a decomposition rate lower than the decomposition rate of the first nitrate ester, and a stabilizer dissolved in at least one of the first nitrate ester and the second nitrate ester. Each of the first nitrate ester and the second nitrate ester is independently selected from the group consisting of nitroglycerin, 1,2,4-butanetriol trinitrate, pentaerythritol tetranitrate, ethylene glycol dinitrate, diethylene glycol dinitrate, diglycerol tetranitrate, 1,2-propanediol dinitrate, trimethylolethane trinitrate, butyl-nitratoethylnitramine, triethyleneglycol dinitrate, and poly(glycidyl nitrate).

In other embodiments, an article comprises a housing and an energetic composition. The energetic composition comprises a continuous matrix comprising a nitrate ester. The continuous matrix surrounds a solid energetic material and a stabilizer, a portion of the stabilizer is dissolved in the continuous matrix and another portion of the stabilizer is in a crystalline state. Alternatively, the energetic composition comprises a first nitrate ester, a second nitrate ester having a decomposition rate lower than the decomposition rate of the first nitrate ester, an energetic material, and a stabilizer soluble in at least one of the first nitrate ester and the second nitrate ester. Each of the first nitrate ester and the second nitrate ester is independently selected from the group consisting of nitroglycerin, 1,2,4-butanetriol trinitrate, pentaerythritol tetranitrate, ethylene glycol dinitrate, diethylene glycol dinitrate, diglycerol tetranitrate, 1,2-propanediol dinitrate, trimethylolethane trinitrate, and butyl-nitratoethylnitramine, triethyleneglycol dinitrate, and poly(glycidyl nitrate).

BRIEF DESCRIPTION OF THE DRAWINGS

While the specification concludes with claims particularly pointing out and distinctly claiming that which is regarded as the invention, advantages of the present disclosure may be more readily ascertained from the following detailed description when read in conjunction with the accompanying drawings in which:

DETAILED DESCRIPTION

Figure 1:
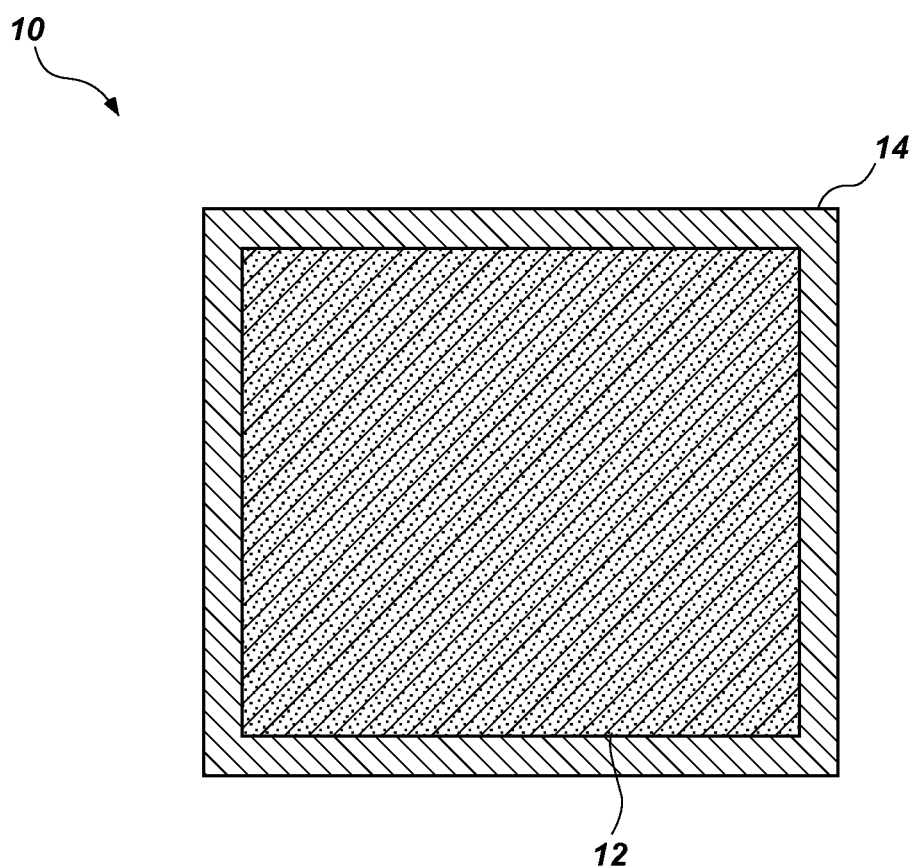
FIG. 1 shows a simplified cross-section of an article having an energetic composition according to an embodiment of the present disclosure.

Stabilized energetic compositions and methods of forming such energetic compositions are described. In one embodiment, the energetic composition includes a nitrate ester, a stabilizer, and solids wherein a portion of the stabilizer is dissolved in the nitrate ester and another portion of the stabilizer is in a crystalline state, separate from the nitrate ester. By including stabilizer in different forms, the energetic composition of the present disclosure may include a greater amount of the stabilizer than present in conventional nitrate ester compositions. In another embodiment, the energetic composition includes a first nitrate ester, a second nitrate ester having a decomposition rate lower than that of the first nitrate ester, an energetic material, and a stabilizer dissolved in at least one of the first nitrate ester and the second nitrate ester. By using different nitrate esters having different decomposition rates, the energetic composition of the present disclosure may be more resistant to the problems associated with FOD than conventional nitrate ester compositions. In yet another embodiment, the energetic composition includes the first nitrate ester and the second nitrate ester, with the second nitrate ester having a decomposition rate lower than that of the first nitrate ester, a portion of the stabilizer dissolved in at least one of the nitrate esters and another portion of the stabilizer in a crystalline state, separate from the nitrate esters. The energetic compositions described herein may exhibit higher resistance to incompatible or foreign materials than conventional nitrate ester compositions, and may thus have a longer lifetime.

As used herein, the term "nitrate ester" means and includes an ester having one or more nitrato ($NO_3$ or $ONO_2$) functional groups. For example, nitrate esters include nitroglycerin (NG), 1,2,4-butanetriol trinitrate (BTTN), pentaerythritol tetranitrate (PETN), ethylene glycol dinitrate (EGDN or nitroglycol), diethylene glycol dinitrate (DEGDN), diglycerol tetranitrate (DGTN), 1,2-propanediol dinitrate (PDDN), trimethylolethane trinitrate (TMETN), butyl-nitratoethylnitramine (butyl NENA), nitrocellulose (NC), triethyleneglycol dinitrate (TEGDN), poly(glycidyl nitrate) (PGN), etc.

The energetic composition may be formed by combining a nitrate ester and a stabilizer to form a premix. The nitrate ester is conventionally NG, but other nitrate esters may also be used. The stabilizer may be resorcinol, 2-nitrodiphenyl amine (2-NDPA), N-methyl-4-nitroaniline (MNA), or combinations thereof. A binder prepolymer, such as a polyethylene glycol (PEG), or another material, may also be added to the premix. The premix may be mixed until it forms a single homogeneous liquid. That is, solid ingredients of the premix may be dissolved into the liquid ingredients. In embodiments in which the stabilizer is a solid at room temperature and the nitrate ester is a liquid at room temperature, the ingredients may be mixed until a portion of the stabilizer dissolves in the nitrate ester. The stabilizer may be added in such an amount that a saturated solution of stabilizer in the nitrate ester is formed. In embodiments in which the premix includes a binder prepolymer, the stabilizer may also be soluble in the binder prepolymer. The premix may be prepared as part of the formation of the energetic composition, but may be prepared separately (e.g., in a separate mixing vessel or at a prior time) from other mixing operations for forming the energetic composition. A premix may optionally be stored, as desired, for a period of time before other operations of forming the energetic composition.

After preparation of the premix, other solid materials may be combined with the premix, such as those materials that are not soluble in the premix. Solids may include class 1.1 explosives (e.g., HMX (cyclotetramethylene tetranitramine), CL-20 (hexanitrohexaazaisowurtzitane), PETN (pentaerythritol tetranitrate), TATB (2,4,6-trinitro-1,3,5-benzenetriamine), RDX (cyclotrimethylene trinitramine), TNAZ (1,3, 3-trinitroazetine), TEX (4,10-dinitro-2,6,8,12-tetraoxa-4,10-diazatetracyclo-[5.5.0.0$^{5,9}$.0$^{3,11}$]-dodecane), TNT (trinitrotoluene), DNT (dinitrotoluene), or combinations thereof), fuels (e.g., aluminum, magnesium, nickel, silicon, boron, beryllium, zirconium, hafnium, zinc, tungsten, molybdenum, copper, or titanium, or combinations thereof), burning-rate modifiers (e.g., iron(III) oxide, carbon black, aluminum oxide ($Al_2O_3$), lead oxide (PbO), a transition metal fluoride such as $CuF_2$ or $FeF_3$, or combinations thereof), oxidizers (e.g., an alkali or alkaline metal nitrate, an alkali or alkaline metal perchlorate, or an alkaline metal peroxide including, but not limited to, AN (ammonium nitrate), AP (ammonium perchlorate), sodium nitrate, potassium nitrate, lithium nitrate, rubidium nitrate, cesium nitrate, lithium perchlorate, sodium perchlorate, potassium perchlorate, rubidium perchlorate, cesium perchlorate, magnesium perchlorate, calcium perchlorate, strontium perchlorate, barium perchlorate, barium peroxide, strontium peroxide, copper oxide, or combinations thereof), etc. Solids such as aluminum oxide ($Al_2O_3$) or zirconium oxide ($ZrO_2$) may also be added to suppress thermoacoustic oscillations. Some of the solids added may be substantially insoluble in the premix, and may form a heterogeneous suspension, which may also be characterized as a slurry, with the premix. The premix may form a continuous matrix surrounding the solids. In some embodiments, an additional stabilizer is added with the solid materials. For example, the stabilizer may be an additional amount of the same material as the stabilizer previously dissolved in the premix, or may be a different material. If the premix was saturated with stabilizer, some of the solid stabilizer added in the solids-addition process may remain in the energetic composition in a solid or crystalline form. In other words, even though a portion of the stabilizer may be soluble in some materials of the premix, some of the stabilizer may not dissolve because the solubility limit of the stabilizer in those materials has already been reached. A portion of the stabilizer may remain in a substantially pure crystalline solid state (e.g., in the same state or at the same purity that the bulk stabilizer was in before addition to the mixture) as the solids are mixed into the premix. By adding additional stabilizer during the solids-addition process, the energetic composition may contain more stabilizer than can be dissolved in the premix or in the binder of the energetic composition. For example, the total concentration of stabilizer (including both dissolved and crystalline) in an energetic composition formed by adding stabilizer in the solids-addition process may be two times, three times, four times, etc., the concentration of stabilizer achievable by adding dissolved stabilizer to the propellant only via the premix. Thus, the amount of stabilizer added to the energetic composition may be in excess of the amount conventionally used to control nitrate ester decomposition during the normal lifetime of the energetic composition. For example, NEPE propellants may be modified, by way of non-limiting example, to have stabilizer concentrations two times, three times, or four times the concentration of conventional NEPE formulations. In a formulation having HMX (a solid), for example, the stabilizer content may be increased by substituting a portion of the HMX with crystalline stabilizer (e.g., MNA).

After combining the solids with the premix, the resulting energetic composition may be cast, pressed, extruded, etc., in any selected form, such as in solid rocket propellant motors, gas generators, smokeless gun powder, munitions, explosives, etc. The energetic composition may be homogeneous or heterogeneous.

In some embodiments, a curing agent may be combined with the energetic composition to promote curing or hardening of the energetic composition. Curing agents are known in the art, and may include, for example, an isocyanate and a cure catalyst. Without being bound to a particular theory, it is believed that the curing agent reacts with prepolymers (e.g., liquid binder in the premix) to form longer chains of polymeric binder having a larger molecular mass, interlocking or binding the suspended solids into a continuous matrix. As the curing agent reacts with the premix, the energetic composition may harden into a cured energetic composition, such as a solid propellant. The concentration of the curing agent may be tailored to effect formation of a material with selected physical properties (e.g., hardness, strength, ductility, etc.). The energetic composition may be cured in an oven maintained at approximately constant temperature and/or humidity.

The stabilizer may be added to the energetic composition in a form other than as solid crystals. For example, the stabilizer may be added as a liquid, dissolved in a liquid carrier, as solid particles or liquid droplets encapsulated in a polymeric membrane, or even as functional groups attached to a polymeric backbone (e.g., aromatic amines on a polymeric backbone, phenyl groups in polystyrene resin or polystyrene beads, etc.). In other words, the stabilizer may be in any physical or chemical form. Stabilizers separated in a distinct crystalline structure or otherwise separated from the binder may provide improved long-term stability to a cured energetic composition.

The efficacy of crystalline stabilizer in an energetic composition may be determined by measuring the time to onset of decomposition resulting from exposure to a known incompatible material. Samples of energetic compositions may be prepared with various formulations, the samples subjected to a known incompatible material under identical conditions, and the samples tested for decomposition of the energetic composition. For example, the time to onset of decomposition may be approximately proportional to the initial stabilizer content of a composition. That is, doubling the amount of stabilizer in a composition may double the amount of time to onset of depletion of the stabilizer.

Because of its high energy content and ability to plasticize certain polymeric binder systems, nitroglycerin (NG) has been a common ingredient in conventional propellants. Different nitrate esters decompose at different rates. Thus, the effect of an incompatible material on a particular energetic composition may also vary depending on the nitrate ester contained in the energetic composition. Partial or substantially complete replacement of one or more nitrate esters with different nitrate esters may change the susceptibility of the energetic composition to degradation.

In some embodiments of the present disclosure, some of the NG of conventional energetic premixes may be replaced with another nitrate ester, such as a nitrate ester having a lower rate of decomposition. In such embodiments, two or more nitrate esters may be combined with the stabilizer to form the premix. For example, some of the NG of a conventional formulation may be replaced with a nitrate ester having higher stability (e.g., higher activation energy and, therefore, greater resistance to decomposition) at ambient temperature than NG. By way of example, the nitrate ester having higher stability may be BTTN. Thus, a premix may be formed by combining a stabilizer with a plurality of nitrate esters (e.g., NG and BTTN), in at least one of which the stabilizer may be substantially soluble. In some embodiments, one of the nitrate esters may be BTTN, PETN, butyl NENA, etc., while the other nitrate ester is NG. In embodiments in which both of the nitrate esters are liquids at room temperature or at the mixing temperature of the premix, the stabilizer may be substantially soluble in both nitrate esters. The nitrate esters may be in any physical form, such as solid, liquid, dissolved in a liquid carrier, solid particles or liquid droplets encapsulated in a membrane, etc. In some embodiments, energetic functional groups (e.g., nitrate groups) may be attached to a polymeric backbone, such as a nitrated polymeric backbone as in NC. A binder prepolymer, such as a PEG, may also be added to the premix.

The premix may be formed by preparing a mixture of nitrate esters selected to be in the resultant energetic composition. For example, the nitrate esters may be separately formed and combined to form the mixture. In some embodiments, the weight ratio of NG to another nitrate ester in the premix may be from about 1 to about 99 (i.e., NG may account for from about 50% to about 99% of the total mass of the nitrate esters). In some embodiments, the weight ratio of NG to another nitrate ester in the premix may be from about 1.5 to about 2.5. In some embodiments, the nitrate esters may be formed simultaneously by conitration of mixed alcohols.

Once the premix is formed, an energetic composition may be formed by conventional techniques by mixing solids and a curing agent with the premix. In some embodiments, additional stabilizer may be added during the solids-addition process beyond the solubility of the stabilizer in the premix, as described previously. The stabilizing effect of additional stabilizer in the energetic composition may be additive or synergistic to the stabilizing effect of having the multiple nitrate esters in the energetic composition.

Due to differing heats of formation, replacement of NG with another nitrate ester may cause a change in performance characteristics (e.g., a lower specific impulse ($I_{sp}$), density, etc.) in the resulting energetic composition. Furthermore, different nitrate esters may produce energetic compositions having different physical or combustion properties. Because of the favorable properties of NG, it may be desirable to retain some of the NG in a formulation, even when adding another nitrate ester to improve stability. For example, an energetic composition with suitable properties for a given application may be formed in which from about 30% to about 40% of the NG has been replaced by another nitrate ester, whereas a similar propellant in which about 60% of the NG has been replaced by another nitrate ester may be unsuitable for that particular application.

The efficacy of partial or total substitution of one nitrate ester for another may be determined by measuring the time to onset of decomposition resulting from exposure to a known incompatible material. That is, samples of energetic compositions according to embodiments of the present disclosure may be prepared with different nitrate esters or nitrate esters in different ratios. The samples may be subjected to an incompatible material under identical conditions, and the samples may be tested for decomposition. For example, an energetic composition in which 30% of the nitrate ester is BTTN and 70% is NG may have a time to onset of decomposition approximately 2.6 times the time to onset of decomposition of a similar composition in which all of the nitrate ester is NG. Initial rates of stabilizer depletion may be different for different compositions, or may be the same.

As shown in FIG. 1, an article 10 may include an energetic composition 12 according to embodiments of the present disclosure. The energetic composition 12 may be contained within a housing 14 of the article 10. By way of example, the article 10 may include a gas generating device, such as an airbag device or a fire suppression device, ordnance, munitions, or a rocket motor. The article 10 may include, but is not limited to, cartridges for small arms ammunition (e.g., rimfire cartridges, center fire cartridges, shot shells, rifled slugs, etc.), grenades, mines, mortar fuses, detcord initiators, illuminating flares, or signaling flares. The energetic composition 12 of the present disclosure may also be used in other explosive and propellant-based devices, such as aircraft ejection seats, tubular goods cutters, explosive bolts, etc.

Figure 2:
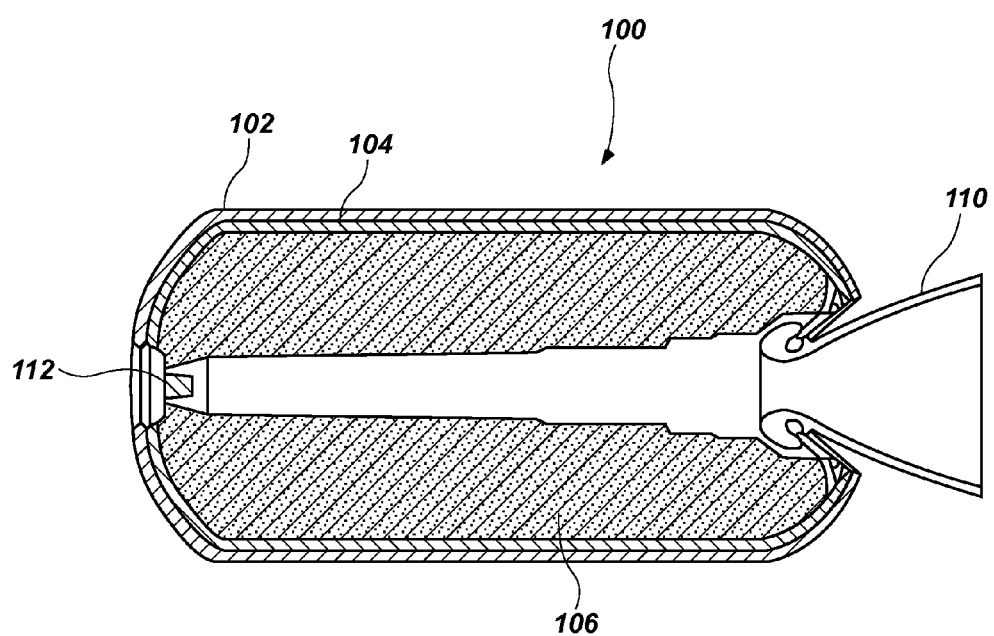
FIG. 2 shows a simplified cross-section of a rocket motor having an energetic composition according to an embodiment of the present disclosure.

As shown in FIG. 2, a rocket motor 100 may include energetic compositions according to embodiments of the present disclosure. For example, a rocket motor 100 may include a case 102, a liner 104 (which may also include an insulator), and an energetic composition according to an embodiment of the present disclosure as propellant 106. The propellant 106 may include a nitrate ester, a stabilizer and an energetic material (e.g., a solid nitramine). The decomposition rate of the propellant 106 may be controlled by the presence of a second nitrate ester and/or a stabilizer in a crystalline state or otherwise separated from the nitrate ester. The rocket motor 100 may include a nozzle assembly 110, an igniter 112, etc.

Increasing the stability of energetic compositions may increase the shelf life of the energetic compositions or the components in which the energetic compositions are used. Increased resistance of energetic compositions to incompatible materials may increase throughput of manufacturing operations because discovery of FOD in a premix or a finished component may be less likely to require disposal of an entire batch of premix, an entire energetic composition, or a finished component. In other words, an energetic composition contaminated with FOD, which would conventionally be disposed of, may be used as planned if the energetic composition is formulated to be resistant to FOD. Thus, the methods and energetic compositions of the present disclosure may be used to lower production costs by increasing the usable yield of the energetic composition. Lifecycle costs may also be decreased by increasing the lifetime of a particular material, which further decreases the costs of production (e.g., of replacement components), logistics, and disposal (e.g., of old, unusable components). Furthermore, an energetic composition contaminated by undetected FOD may be more likely to perform properly if the energetic composition is formulated to be resistant to FOD. Thus, the methods disclosed herein may enhance safety of handling and use of energetic compositions and components including the energetic compositions. The methods may be used to modify any nitrate ester-based composition, such as solid propellants, gas generators, smokeless powders, explosives, igniters, etc. The methods may provide protection from degradation throughout the energetic composition, which may be valuable in protecting against incompatible FOD because the location of FOD within a mixture cannot be predicted.

The energetic composition of the present disclosure may be useful as a propellant composition, a gas generator composition, a smokeless gun powder composition, a munitions composition, or an explosive composition. The energetic composition may be used as a replacement for conventional NEPE propellants.

The following examples serve to explain embodiments of the energetic compositions and methods of forming the energetic compositions in more detail. These examples are not to be construed as being exhaustive or exclusive as to the scope of the disclosure.

EXAMPLES

Materials were purchased from commercial sources, such as Bayer MaterialScience LLC (Pittsburgh, Pa.), Air Products and Chemicals, Inc. (Allentown, Pa.), 3M (St. Paul, Minn.), Western Electrochemical Company (WECCO) (Cedar City, Utah), BAE Systems, Inc. (Arlington, Va.), Toyal America (Naperville, Ill.), Island Pyrochemical Industries (Mineola, N.Y.), Hagedorn AG (Osnabruck, Germany), Cognis Corporation (Cincinnati, Ohio), Boulder Scientific Company (Mead, Colo.), Sigma-Aldrich (St. Louis, Mo.), Valimet, Inc. (Stockton, Calif.), and Naval Surface Warfare Center, Indian Head Division (Indian Head, Md.). Percentages in the following examples, including premix percentages, are weight percentages based on the total energetic composition mixture weight before addition of triphenylbismuth (TPB). The ingredients of these examples are also summarized in Table 1 below.

Example 1

Conventional Propellant

A nominal 1800-gallon mixture (about 25,000 lbs) of propellant was produced to fill non-experimental rocket motors. Nitroglycerin (NG) was formed by a Biazzi nitration process, after which 2-NDPA (2-nitrodiphenyl amine, available from Island Pyrochemical) was added to stabilize the NG. A premix was prepared by combining 17.41% of the stabilized NG (which included 17.24% of NG and 0.17% of 2-NDPA) with 0.18% of nitrocellulose having a nitrogen content of about 12.0% (NC, available from Hagedorn), 6.16% of polyethylene glycol having an average molecular weight of about 4,500 g/mol (PEG 4500, available from Cognis), and 0.56% of N-methyl-4-nitroaniline (MNA, available from Island Pyrochemical). The premix was stirred and heated to a temperature of about 140° F. in a sparge vessel until all the solids were dissolved. The premix was placed in an 1800-gallon mixer. Solids were added and mixed stepwise in portions to allow the mixer to properly mix the solids into the liquids without binding or excessive frictional heating. The mixer was maintained at a temperature of about 120° F. The solids added to the mix included 6.60% of 20 μm AP (ammonium perchlorate having a mean diameter of about 20 μm, formed by grinding 200 μm AP, available from WECCO), 8.40% of 70 μm AP (AP having a mean diameter of 70 μm, formed by grinding 200 μm AP), 10.50% of 11 μm HMX (HMX having a mean diameter of about 11 μm, ground from HMX available from BAE Systems, Inc.), 31.50% of 4 μm HMX (HMX having a mean diameter of about 4 μm, ground from HMX available from BAE Systems, Inc.), 18.00% of X-86 Al (aluminum powder having an average particle size of 34 μm, available from Toyal America), and 0.69% of DESMODUR® N-100 (solvent-free aliphatic polyisocyanate resin based on hexamethylene diisocyanate, available from Bayer MaterialScience). The above quantities total 100%. TPB (triphenylbismuth, available from Boulder Scientific) was added to the mix in a quantity of 0.020% of the total of all other components. After completion of the mix, a portion of the propellant was removed for preparing the samples for this test, while a remainder of the propellant was used in motors cast in accordance with industry practice. The propellant formulation is shown below in Table 1.

A small portion of propellant was poured into each of six 125 mL polycarbonate jars so that the bottom of each jar was covered. A portion of polyoxymethylene was pressed into the propellant on the bottom of each jar. The jars were then substantially filled with additional propellant to cover the polyoxymethylene, and placed into a curing oven at approximately 120° F. for 5 days. The samples of Example 1 were control samples, tested as a baseline for the samples of Example 2, as described below.

Example 2

Increased MNA Stabilizer Content (2x)

A nominal 1-gallon mixture (about 14 lbs) of propellant was produced to test the effect of doubling the stabilizer content. A premix was prepared by combining 17.41% of stabilized NG (which included 17.24% of NG and 0.17% of 2-NDPA) with 0.18% of NC, 6.16% of PEG 4500, and 0.56% of MNA. The premix was stirred and heated to a temperature of about 140° F. in a sparge vessel until all the solids were dissolved. The premix was placed in a 1-gallon mixer. Solids were added and mixed stepwise in portions to allow the mixer to properly mix the solids into the liquids without binding or excessive frictional heating. The mixer was maintained at a temperature of about 120° F. The solids added to the mix included 0.56% of additional MNA, 6.60% of 20 μm AP, 8.40% of 70 μm AP, 10.36% of 11 μm HMX, 31.08% of 4 μm HMX, 18.00% of X-86 Al, and 0.69% of DESMODUR® N-100. TPB was added to the mix in a quantity of 0.020% of the total of all other components. After completion of the mix, a small portion of propellant was poured into each of six 125 mL polycarbonate jars so that the bottom of each jar was covered. A portion of polyoxymethylene was pressed into the propellant on the bottom of each jar. The jars were then substantially filled with additional propellant to cover the polyoxymethylene, and placed into a curing oven at approximately 120° F. for 5 days. The propellant formulation is shown below in Table 1. The samples of Example 2 were tested with the control samples of Example 1.

Figure 3:
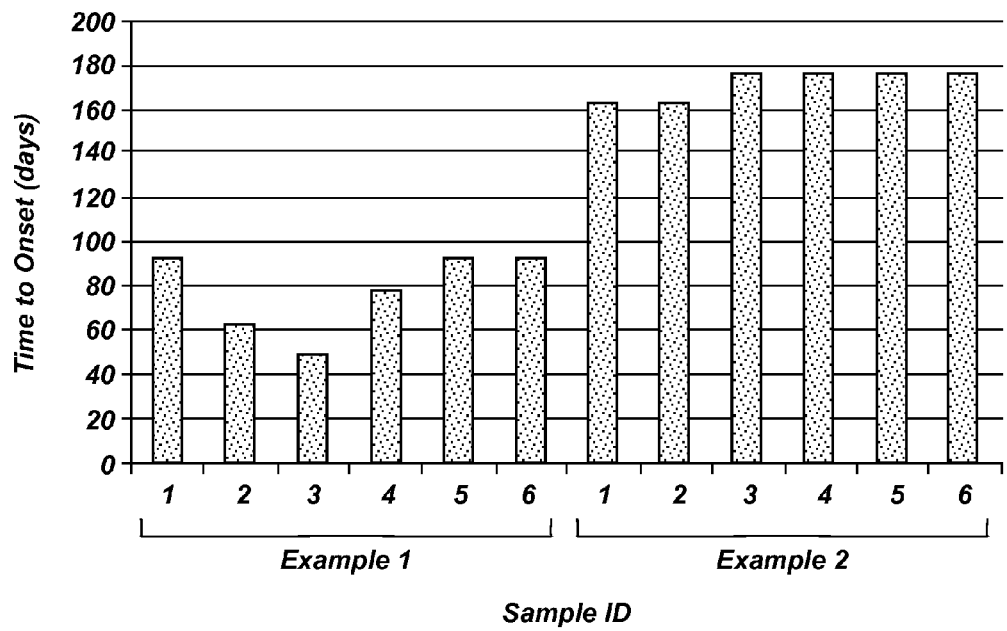
FIGS. 3 through 9 are graphs comparing the time to onset of decomposition of conventional propellants with the time to onset of decomposition of energetic compositions according to embodiments of the present disclosure.

The jars of Example 1 and Example 2 were placed in a single inner pipe, which was placed within a larger-diameter pipe. Temperature-controlled water was passed through the larger-diameter pipe to maintain the inner pipe and the samples at a constant temperature of approximately 120° F. Both pipes were placed underground to provide additional insulation. This double-pipe configuration is referred to in the art as a "pipe oven." The jars were temporarily removed from the pipe oven every 14 days to check for decomposition. Upon removal, the jars were inverted, and the appearance of the propellant at the bottom of the jars was observed and photographed. The propellant was determined to have experienced the onset of decomposition when a color change was observed in the propellant at the bottom of the jar (i.e., the propellant closest to the polyoxymethylene). If decomposition was not observed, the jars were returned to the pipe oven. As shown in FIG. 3, the average time to onset of decomposition of the six samples of propellant of Example 2 was about 172.0 days, whereas the control samples of Example 1 under the same storage conditions had an average time to onset of decomposition of about 77.9 days. Thus, the propellant of Example 2 showed a 121% improvement in the average time to onset of decomposition over the conventional propellant of Example 1.

Example 3

Conventional Propellant

A nominal 1800-gallon mixture of propellant was produced to fill non-experimental rocket motors. A premix was prepared by combining 17.45% of stabilized NG (which included 17.28% of NG and 0.17% of 2-NDPA) with 0.18% of NC, 6.18% of PEG 4500, and 0.56% of MNA. The premix was stirred and heated to a temperature of about 140° F. in a sparge vessel until all the solids were dissolved. The premix was placed in an 1800-gallon mixer. Solids were added and mixed stepwise in portions to allow the mixer to properly mix the solids into the liquids without binding or excessive frictional heating. The mixer was maintained at a temperature of about 120° F. The solids added to the mix included 6.60% of 20 μm AP, 8.40% of 70 μm AP, 10.50% of 11 μm HMX, 31.50% of 4 μm HMX, 18.00% of X-86 Al, and 0.63% of DESMODUR® N-100. The above quantities total 100%. TPB was added to the mix in a quantity of 0.020% of the total of all other components. After completion of the mix, a portion of the propellant was removed for preparing the samples for this test, while the remainder of the propellant was used in motors cast in accordance with industry practice. The propellant formulation is shown in Table 1.

A small portion of propellant was poured into each of thirty 125 mL polycarbonate jars so that the bottom of each jar was covered. A portion of polyoxymethylene was pressed into the propellant on the bottom of each jar. The jars were then substantially filled with additional propellant to cover the polyoxymethylene, and placed into a curing oven at approximately 120° F. for 5 days. The samples of Example 3 were control samples tested with the samples of Examples 4 through 8, as described below.

Example 4

Increased MNA Stabilizer Content (3x)

A nominal 1-gallon mixture of propellant was produced to test the effect of tripling the stabilizer content. A premix was prepared by combining 17.41% of stabilized NG (which included 17.24% of NG and 0.17% of 2-NDPA) with 0.18% of NC, 6.16% of PEG 4500, and 0.56% of MNA. The premix was stirred and heated to a temperature of about 140° F. in a sparge vessel until all the solids were dissolved. The premix was placed in a 1-gallon mixer. Solids were added and mixed stepwise in portions to allow the mixer to properly mix the solids into the liquids without binding or excessive frictional heating. The temperature of the mixer was maintained at a temperature of about 120° F. The solids added to the mix included 1.12% of additional MNA, 6.60% of 20 μm AP, 8.40% of 70 μm AP, 10.22% of 11 μm HMX, 30.66% of 4 μm HMX, 18.00% of X-86 Al, and 0.69% of DESMODUR® N-100. TPB was added to the mix in a quantity of 0.020% of the total of all other components. After completion of the mix, a small portion of propellant was poured into each of six 125 mL polycarbonate jars so that the bottom of each jar was covered. A portion of polyoxymethylene was pressed into the propellant on the bottom of each jar. The jars were then substantially filled with additional propellant to cover the polyoxymethylene, and placed into a curing oven at approximately 120° F. for 5 days. The propellant formulation is shown below in Table 1. The six samples of Example 4 were tested with six control samples of Example 3.

Figure 4:
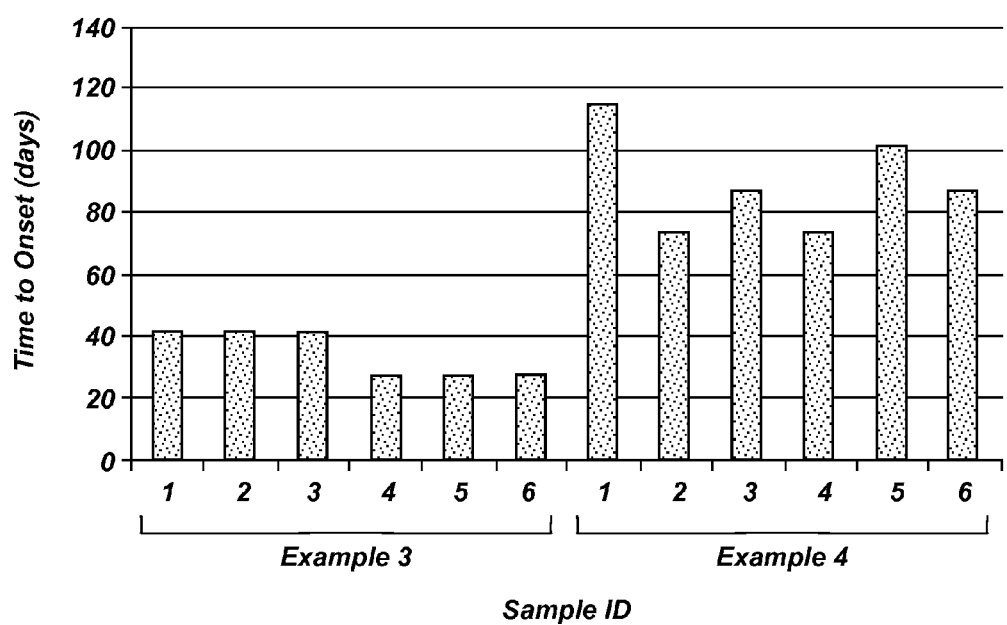

The jars of Example 3 and Example 4 were placed in a pipe oven at a constant temperature of approximately 120° F. as described above in reference to Example 2. As shown in FIG. 4, the average time to onset of decomposition of the six samples of propellant of Example 4 was about 89.5 days, whereas the control samples of Example 3 under the same storage conditions had an average time to onset of decomposition of about 34.0 days. Thus, the propellant of Example 4 showed a 163% improvement in the average time to onset of decomposition over the conventional propellant of Example 3.

Example 5

Increased MNA Stabilizer Content (4x)

A nominal 1-gallon mixture of propellant was produced to test the effect of quadrupling the stabilizer content. A premix was prepared by combining 17.41% of stabilized NG (which included 17.24% of NG and 0.17% of 2-NDPA) with 0.18% of NC, 6.16% of PEG 4500, and 0.56% of MNA. The premix was stirred and heated to a temperature of about 140° F. in a sparge vessel until all the solids were dissolved. The premix was placed in a 1-gallon mixer. Solids were added and mixed stepwise in portions to allow the mixer to properly mix the solids into the liquids without binding or excessive frictional heating. The mixer was maintained at a temperature of about 120° F. The solids added to the mix included 1.68% of additional MNA, 6.60% of 20 μm AP, 8.40% of 70 μm AP, 10.08% of 11 μm HMX, 30.24% of 4 μm HMX, 18.00% of X-86 Al, and 0.69% of DESMODUR® N-100. TPB was added to the mix in a quantity of 0.020% of the total of all other components. After completion of the mix, a small portion of propellant was poured into each of six 125 mL polycarbonate jars so that the bottom of each jar was covered. A portion of polyoxymethylene was pressed into the propellant on the bottom of each jar. The jars were then substantially filled with additional propellant to cover the polyoxymethylene, and placed into a curing oven at approximately 120° F. for 5 days. The propellant formulation is shown below in Table 1. The six samples of Example 5 were tested with six control samples of Example 3.

Figure 5:
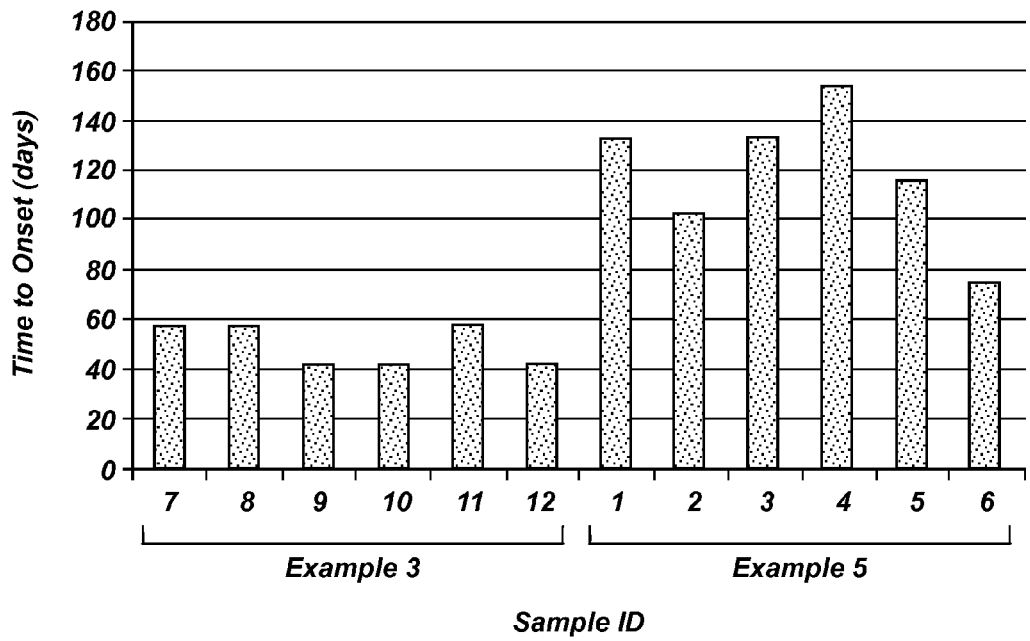

The jars of Example 3 and Example 5 were placed in a pipe oven at a constant temperature of approximately 120° F. as described above in reference to Example 2. As shown in FIG. 5, the average time to onset of decomposition of the six samples of propellant of Example 5 was about 118.1 days, whereas the control samples of Example 3 under the same storage conditions had an average time to onset of decomposition of about 49.5 days. Thus, the propellant of Example 5 showed a 139% improvement in the average time to onset of decomposition over the conventional propellant of Example 3.

Example 6

Replacement of 30% of NG with BTTN

A nominal 1-gallon mixture of propellant was produced to test the effect of replacing 30% of the NG with BTTN. A premix was prepared by combining 17.51% of stabilized nitrate ester (which included 12.13% of NG, 5.20% of BTTN (available from NSWC, Indian Head Division), and 0.18% of 2-NDPA) with 0.07% of NC, 6.18% of PEG 4500, and 0.56% of MNA. The premix was stirred and heated to a temperature of about 140° F. in a sparge vessel until all the solids were dissolved. The premix was placed in a 1-gallon mixer. Solids were added and mixed stepwise in portions to allow the mixer to properly mix the solids into the liquids without binding or excessive frictional heating. The mixer was maintained at a temperature of about 120° F. The solids added to the mix included 3.00% of 21 μm AP (AP having a mean diameter of 21 μm, formed by grinding 200 μm AP), 7.00% of 99 μm AP (AP having a mean diameter of 99 μm, formed by grinding 200 μm AP), 35.25% of 11 μm HMX, 11.75% of 4 μm HMX, 18.00% of H-3 Al (aluminum powder having a mean diameter of about 4.5 μm, available from Valimet, Inc.), and 0.68% of DESMODUR® N-100. TPB was added to the mix in a quantity of 0.050% of the total of all other components. After completion of the mix, a small portion of propellant was poured into each of six 125 mL polycarbonate jars so that the bottom of each jar was covered. A portion of polyoxymethylene was pressed into the propellant on the bottom of each jar. The jars were then substantially filled with additional propellant to cover the polyoxymethylene, and placed into a curing oven at approximately 120° F. for 7 days. The propellant formulation is shown below in Table 1. The six samples of Example 6 were tested with six control samples of Example 3.

Figure 6:
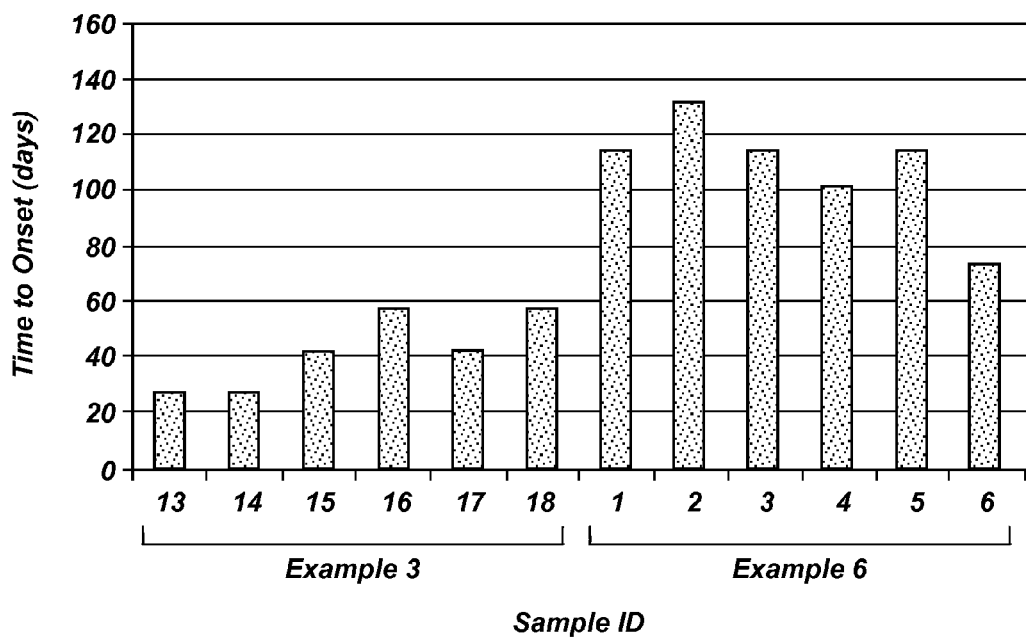

The jars of Example 3 and Example 6 were placed in a pipe oven at a constant temperature of approximately 120° F. as described above in reference to Example 2. As shown in FIG. 6, the average time to onset of decomposition of the six samples of propellant of Example 6 was about 108.7 days, whereas the control samples of Example 3 under the same storage conditions have an average time to onset of decomposition of about 42.0 days. Thus, the propellant of Example 6 showed a 159% improvement in the time to onset of decomposition over the conventional propellant of Example 3.

Example 7

Replacement of 40% of NG with Triacetin

A nominal 1-gallon mixture of propellant was produced to test the effect of replacing about 40% of the NG with 1,2,3-triacetoxypropane, commonly known as triacetin (TA). While TA is not considered a practical ingredient in NEPE propellant formulations due to its negative heat of explosion, the propellant of Example 7 was tested as a proof-of-concept formulation. A premix was prepared by combining 10.39% of stabilized NG (which included 10.21% of NG and 0.10% of 2-NDPA) with 0.07% additional 2-NDPA, 0.18% of NC, 6.98% of TA (available from Sigma-Aldrich), 6.15% of PEG 4500, and 0.56% of MNA. The premix was stirred and heated to a temperature of about 140° F. in a sparge vessel until all the solids were dissolved. The premix was placed in a 1-gallon mixer. Solids were added and mixed stepwise in portions to allow the mixer to properly mix the solids into the liquids without binding or excessive frictional heating. The mixer was maintained at a temperature of about 120° F. The solids added to the mix included 6.60% of 20 μm AP, 8.40% of 70 μm AP, 10.50% of 11 μm HMX, 31.50% of 4 μm HMX, 18.00% of X-86 Al, and 0.75% of DESMODUR® N-100. TPB was added to the mix in a quantity of 0.050% of the total of all other components. After completion of the mix, a small portion of propellant was poured into each of six 125 mL polycarbonate jars so that the bottom of each jar was covered. A portion of polyoxymethylene was pressed into the propellant on the bottom of each jar. The jars were then substantially filled with additional propellant to cover the polyoxymethylene, and placed into a curing oven at approximately 120° F. for 5 days. The propellant formulation is shown below in Table 1. The six samples of Example 7 were tested with six control samples of Example 3.

Figure 7:
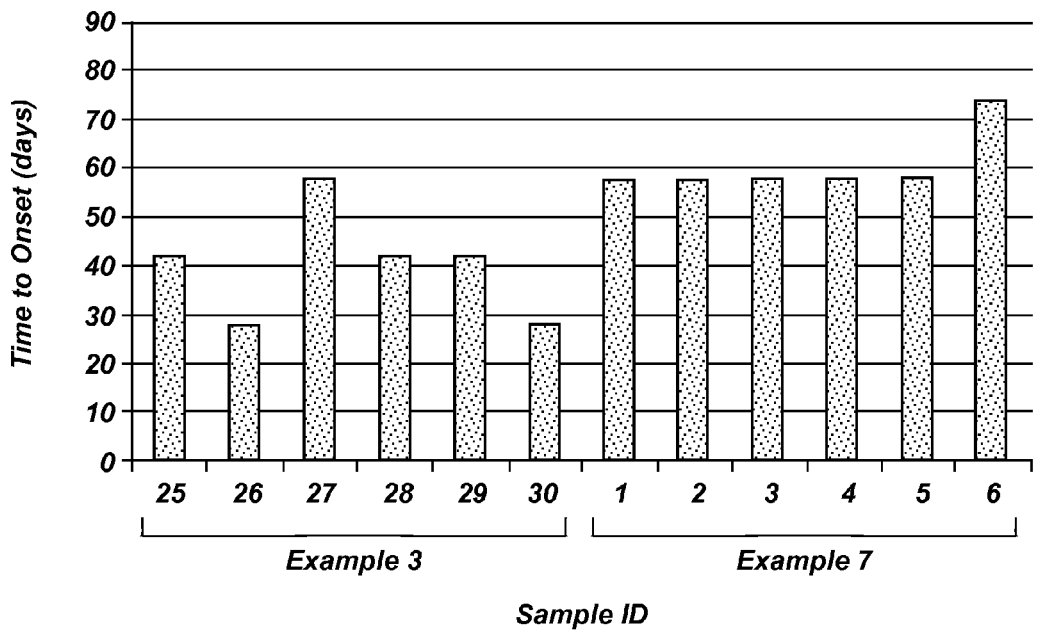

The jars of Example 3 and Example 7 were placed in a pipe oven at a constant temperature of approximately 120° F. as described above in reference to Example 2. As shown in FIG. 7, the average time to onset of decomposition of the six samples of propellant of Example 7 was about 60.7 days, whereas the control samples of Example 3 under the same storage conditions had an average time to onset of decomposition of about 40.0 days. Thus, the propellant of Example 7 showed a 52% improvement in the time to onset of decomposition over the conventional propellant of Example 3.

Example 8

Replacement of PEG 4500 with Polydiethyleneglycol Adipate (PGA)

A nominal 1-gallon mixture of propellant was produced to test the effect of replacing the PEG 4500 with polydiethyleneglycol adipate (PGA). The propellant of Example 8 was tested as a proof-of-concept formulation. A premix was prepared by combining 21.56% of stabilized NG (which included 21.34% of NG and 0.22% of 2-NDPA) with 0.06% of NC, 6.14% of PGA (available from Bayer), and 0.62% of MNA. The premix was stirred and heated to a temperature of about 140° F. in a sparge vessel until all the solids were dissolved. The premix was placed in a 1-gallon mixer. Solids were added and mixed stepwise in portions to allow the mixer to properly mix the solids into the liquids without binding or excessive frictional heating. The mixer was maintained at a temperature of about 120° F. The solids added to the mix included 10.00% of 20 μm AP, 20.25% of 11 μm HMX, 20.25% of 4 μm HMX, 19.50% of X-86 Al, and 1.62% of DESMODUR® N-100. TPB was added to the mix in a quantity of 0.010% of the total of all other components. After completion of the mix, a small portion of propellant was poured into each of six 125 mL polycarbonate jars so that the bottom of each jar was covered. A portion of polyoxymethylene was pressed into the propellant on the bottom of each jar. The jars were then substantially filled with additional propellant to cover the polyoxymethylene, and placed into a curing oven at approximately 120° F. for 5 days. The propellant formulation is shown below in Table 1. The six samples of Example 7 were tested with six control samples of Example 3.

Figure 8:
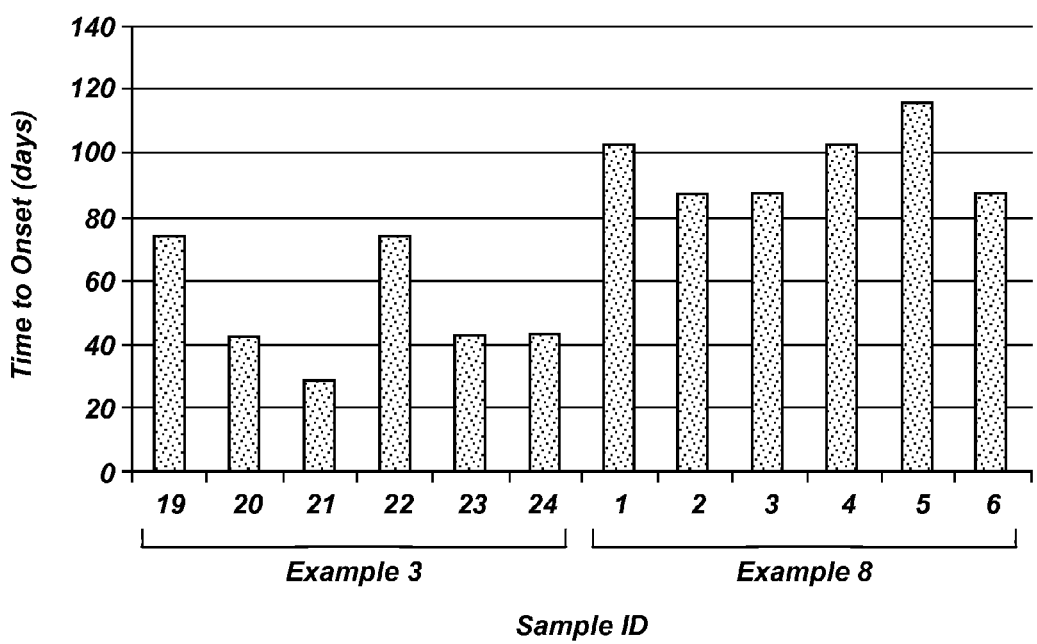
Figure 9:
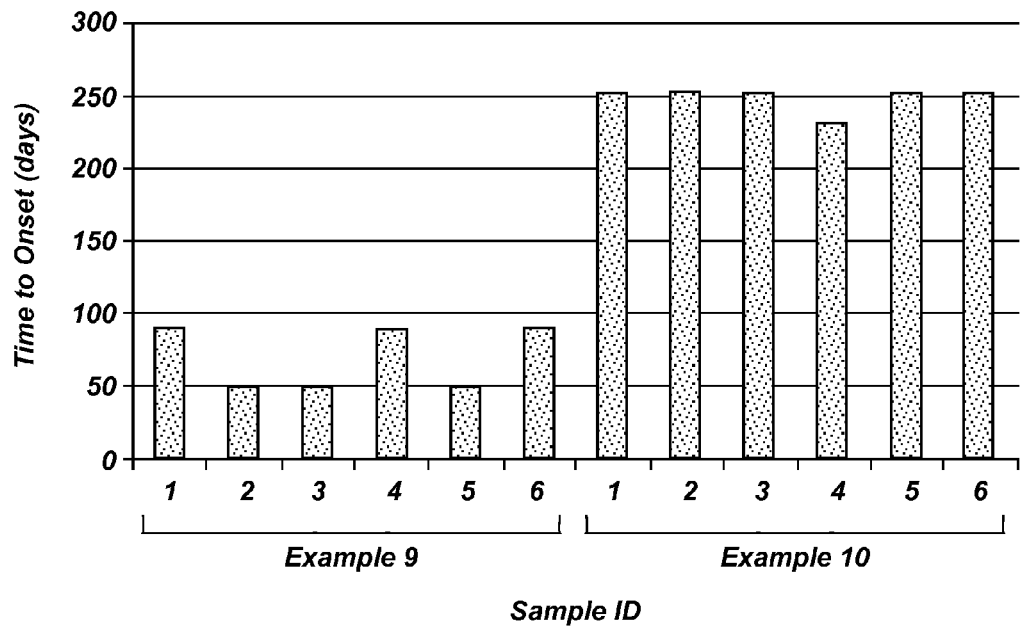

The jars of Example 3 and Example 8 were placed in a pipe oven at a constant temperature of approximately 120° F. as described above in reference to Example 2. As shown in FIG. 8, the average time to onset of decomposition of the six samples of propellant of Example 8 was about 97.4 days, whereas the control samples of Example 3 under the same storage conditions had an average time to onset of decomposition of about 50.3 days. Thus, the propellant of Example 8 showed a 94% improvement in the time to onset of decomposition over the conventional propellant of Example 3.

Example 9

Conventional Propellant

A nominal 1-gallon mixture of propellant was produced as a control. A premix was prepared by combining 17.45% of stabilized NG (which included 17.28% of NG and 0.17% of 2-NDPA) with 0.18% of NC, 6.18% of PEG 4500, and 0.56% of MNA. The premix was stirred and heated to a temperature of about 140° F. in a sparge vessel until all of the solids were dissolved. The premix was placed in a 1-gallon mixer. Solids were added and mixed stepwise in portions to allow the mixer to properly mix the solids into the liquids without binding or excessive frictional heating. The temperature of the mixer was maintained at a temperature of about 120° F. The solids added to the mix included 6.60% of 20 μm AP, 8.40% of 70 μm AP, 10.50% of 11 μm HMX, 31.50% of 4 μm HMX, 18.00% of X-86 Al, and 0.63% of DESMODUR® N-100. The above quantities total 100%. TPB was added to the mix in a quantity of 0.020% of the total of all other components. After completion of the mix, a portion of the propellant was removed for preparing the samples for this test, while a remainder of the propellant was used in motors cast in accordance with industry practice. The propellant formulation is shown in Table 1.

A small portion of propellant was poured into each of six 125 mL polycarbonate jars so that the bottom of each jar was covered. A portion of polyoxymethylene was pressed into the propellant on the bottom of each jar. The jars were then substantially filled with additional propellant to cover the polyoxymethylene, and placed into a curing oven at approximately 120° F. for 5 days. The samples of Example 9 were control samples, tested with the samples of Example 10, as described below.

Example 10

Increased MNA Stabilizer Content (3x) and Partial Substitution of NG with BTTN

A nominal 1-gallon mixture of propellant was produced to test the effect of tripling the stabilizer content and replacing 30% of the NG with BTTN. A premix was prepared by combining 17.51% of stabilized nitrate ester plasticizers (which included 12.13% of NG, 5.20% BTTN, and 0.18% of 2-NDPA) with 0.07% of NC, 6.18% of PEG 4500, and 0.56% of MNA. The premix was stirred and heated to a temperature of about 140° F. in a sparge vessel until all the solids were dissolved. The premix was placed in a 1-gallon mixer. Solids were added and mixed stepwise in portions to allow the mixer to properly mix the solids into the liquids without binding or excessive frictional heating. The temperature of the mixer was maintained at a temperature of about 120° F. The solids added to the mix included 1.12% of additional MNA, 3.00% of 21 μm AP, 7.00% of 99 μm AP, 34.41% of 11 μm HMX, 11.47% of 4 μm HMX, 18.00% of X-50 Al (available from Valimet, Inc.), and 0.68% of DESMODUR® N-100. TPB was added to the mix in a quantity of 0.050% of the total of all other components. After completion of the mix, a small portion of propellant was poured into each of six 125 mL polycarbonate jars so that the bottom of each jar was covered. A portion of polyoxymethylene was pressed into the propellant on the bottom of each jar. The jars were then substantially filled with additional propellant to cover the polyoxymethylene, and placed into a curing oven at approximately 120° F. for 7 days. The propellant formulation is shown below in Table 1. The six samples of Example 10 were tested with the six control samples of Example 9.

The jars of Example 9 and Example 10 were placed in a pipe oven at a constant temperature of approximately 120° F. as described above in reference to Example 2. The time to onset of decomposition was observed to be 231.5±7.5 days for one of the six samples of Example 10, and greater than 252 days for the other five samples (i.e., the other five samples had not experienced the onset of decomposition after 252 days), for an average time to onset of decomposition of at least 249 days. The control samples of Example 9 under the same storage conditions had an average time to onset of decomposition of about 70 days. Thus, the propellant of Example 10 showed at least a 255% improvement in the time to onset of decomposition over the conventional propellant of Example 9.

Figure 10:
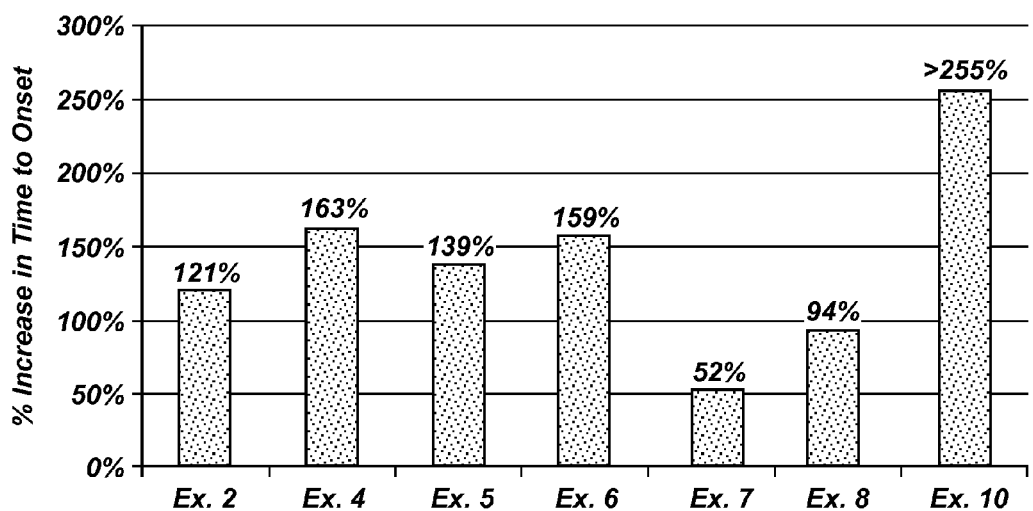
FIG. 10 is a graph comparing the relative increases of the time to onset of decomposition of energetic compositions according to embodiments of the present disclosure.

The percentage of improvement in the time to onset of decomposition of the propellants of Examples 1 through 10 is also shown in FIG. 10. The time to onset of decomposition of each of the propellants of Examples 2, 4, 5, 6, 7, 8, and 10 is compared with the time to onset of decomposition of the appropriate control propellant from Examples 1, 3, or 9. The two individual modifications producing the greatest percentage increase in the time to the onset of decomposition were the tripling of the amount of stabilizer and the replacement of 30% of the NG with BTTN, in Examples 4 and 6, respectively. These two modifications produced propellants having a time to onset of decomposition of 163% and 159% longer, respectively, than the time to onset of their control samples. Because the samples of Example 10 exhibit an average time to onset of decomposition of at least 249 days, it appears that tripling the amount of stabilizer and substituting 30% of the NG with BTTN increases the time to onset of decomposition by at least 255%.

TABLE 1

Example Formulations

| Ingredient | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Premix: | | | | | | | | | | |
| NC | 0.18 | 0.18 | 0.18 | 0.18 | 0.18 | 0.07 | 0.18 | 0.06 | 0.18 | 0.07 |
| 2-NDPA | 0.17 | 0.17 | 0.17 | 0.17 | 0.17 | 0.18 | 0.17 | 0.22 | 0.17 | 0.18 |
| NG | 17.24 | 17.24 | 17.28 | 17.24 | 17.24 | 12.13 | 10.21 | 21.34 | 17.28 | 12.13 |
| PEG 4500 | 6.16 | 6.16 | 6.18 | 6.16 | 6.16 | 6.18 | 6.15 | — | 6.18 | 6.18 |
| MNA (in premix) | 0.56 | 0.56 | 0.56 | 0.56 | 0.56 | 0.56 | 0.56 | 0.62 | 0.56 | 0.56 |
| BTTN | — | — | — | — | — | 5.20 | — | — | — | 5.20 |
| TA | — | — | — | — | — | — | 6.98 | — | — | — |
| PGA | — | — | — | — | — | — | — | 6.14 | — | — |
| Total Premix: | 24.31 | 24.31 | 24.37 | 24.31 | 24.31 | 24.32 | 24.25 | 28.38 | 24.37 | 24.32 |
| Solids: | | | | | | | | | | |
| AP | 15.00 | 15.00 | 15.00 | 15.00 | 15.00 | 10.00 | 15.00 | 10.00 | 15.00 | 10.00 |
| HMX | 42.00 | 41.44 | 42.00 | 40.88 | 40.32 | 47.00 | 42.00 | 40.50 | 42.00 | 45.88 |
| Al | 18.00 | 18.00 | 18.00 | 18.00 | 18.00 | 18.00 | 18.00 | 19.50 | 18.00 | 18.00 |
| MNA (solid) | — | 0.56 | — | 1.12 | 1.68 | — | — | — | — | 1.12 |
| Total Solids: | 75.00 | 75.00 | 75.00 | 75.00 | 75.00 | 75.00 | 75.00 | 70.00 | 75.00 | 75.00 |
| Liquid: | | | | | | | | | | |
| DESMODUR® N-100 | 0.69 | 0.69 | 0.63 | 0.69 | 0.69 | 0.68 | 0.75 | 1.62 | 0.63 | 0.68 |
| Total (before TPB): | 100.00 | 100.00 | 100.00 | 100.00 | 100.00 | 100.00 | 100.00 | 100.00 | 100.00 | 100.00 |
| TPB Added: | 0.020 | 0.020 | 0.020 | 0.020 | 0.020 | 0.050 | 0.050 | 0.010 | 0.020 | 0.050 |

While the present disclosure is susceptible to various modifications and alternative forms, specific embodiments have been shown by way of example in the drawings and have been described in detail herein. However, the present disclosure is not intended to be limited to the particular forms disclosed. Rather, the present disclosure is to cover all modifications, equivalents, and alternatives falling within the scope of the present invention as defined by the following appended claims and their legal equivalents.

What is claimed is:

1. An energetic composition, comprising:
   a suspension comprising a continuous matrix comprising nitrocellulose, 2-nitrodiphenyl amine, polyethylene glycol, and N-methyl-4-nitroaniline, wherein the N-methyl-4-nitroaniline is dissolved in the continuous matrix;
   a solid energetic material suspended in the continuous matrix; and
   a crystalline stabilizer comprising crystalline N-methyl-4-nitroaniline suspended in the continuous matrix.

2. The energetic composition of claim 1, further comprising a nitrate ester having a greater resistance to decomposition than the nitrocellulose.

3. The energetic composition of claim 1, wherein the continuous matrix is in a liquid state.

4. The energetic composition of claim 1, wherein the continuous matrix is in a solid state.

5. An energetic composition, comprising:
   nitroglycerin, nitrocellulose, 2-nitrodiphenyl amine, polyethylene glycol, N-methyl-4-nitroaniline, ammonium perchlorate, HMX, and aluminum;

a nitrate ester selected from the group consisting of 1,2,4-butanetriol trinitrate, pentaerythritol tetranitrate, ethylene glycol dinitrate, diethylene glycol dinitrate, diglycerol tetranitrate, 1,2-propanediol dinitrate, trimethylolethane trinitrate, butyl-nitratoethylnitramine, triethyleneglycol dinitrate, and poly(glycidyl nitrate); and a stabilizer dissolved in each of the nitroglycerin and the nitrate ester.

6. The energetic composition of claim 5, wherein a weight ratio of the nitroglycerin to the nitrate ester is from about 1.5 to about 2.5.

7. The energetic composition of claim 5, further comprising an additional amount of the stabilizer as a crystalline solid, the crystalline solid substantially free of nitroglycerin and the nitrate ester.

8. The energetic composition of claim 5, further comprising a solid energetic material suspended in the nitroglycerin and the nitrate ester.

9. An article, comprising:
a housing; and
an energetic composition in the housing, the energetic composition comprising:
a suspension comprising a continuous matrix comprising a nitrate ester;
a solid energetic material comprising HMX suspended in the continuous matrix;
a crystalline stabilizer suspended in the continuous matrix; and
a dissolved stabilizer in the continuous matrix, wherein the dissolved stabilizer comprises the same chemical composition as the crystalline stabilizer.

10. The article of claim 9, wherein the energetic composition is selected from the group consisting of a propellant composition, a gas generator composition, a smokeless gun powder composition, a munitions composition, and an explosive composition.

11. The article of claim 9, wherein the article comprises a rocket motor, a gas generating device, ordnance, or munitions.

12. The article of claim 9, wherein the article comprises a rocket motor.

13. An article, comprising:
a housing; and
an energetic composition in the housing, the energetic composition comprising:
nitroglycerin, nitrocellulose, 2-nitrodiphenyl amine, polyethylene glycol, N-methyl-4-nitroaniline, ammonium perchlorate, HMX, and aluminum;
a nitrate ester selected from the group consisting of 1,2,4-butanetriol trinitrate, pentaerythritol tetranitrate, ethylene glycol dinitrate, diethylene glycol dinitrate, diglycerol tetranitrate, 1,2-propanediol dinitrate, trimethylolethane trinitrate, butyl-nitratoethylnitramine, triethyleneglycol dinitrate, and poly(glycidyl nitrate);
a stabilizer dissolved in each of the nitroglycerin and the nitrate ester.

14. The article of claim 13, wherein the energetic composition is selected from the group consisting of a propellant composition, a gas generator composition, a smokeless gun powder composition, a munitions composition, and an explosive composition.

15. The article of claim 13, wherein the article comprises a rocket motor, a gas generating device, ordnance, or munitions.

16. The article of claim 13, wherein the article comprises a rocket motor.

17. The energetic composition of claim 1, wherein the sum of the N-methyl-4-nitroaniline in the suspension and the crystalline N-methyl-4-nitroaniline comprises at least about 1.0% by weight of the energetic composition.

18. An energetic composition, comprising:
a suspension comprising a continuous matrix comprising a nitrate ester;
a solid energetic material comprising HMX suspended in the continuous matrix;
a crystalline stabilizer suspended in the continuous matrix; and
a dissolved stabilizer in the continuous matrix, wherein the dissolved stabilizer comprises the same chemical composition as the crystalline stabilizer.

19. The energetic composition of claim 1, wherein the energetic composition comprises ammonium perchlorate, HMX, and aluminum, suspended in the continuous matrix.

20. An energetic composition, comprising:
a continuous matrix comprising nitroglycerin, nitrocellulose, 2-nitrodiphenyl amine, polyethylene glycol, and N-methyl-4-nitroaniline, wherein the N-methyl-4-nitroaniline is dissolved in the polyethylene glycol; and
ammonium perchlorate, HMX, aluminum, and N-methyl-4-nitroaniline suspended in the continuous matrix;
wherein
the nitroglycerine comprises from about 10% to about 18% by weight of the energetic composition;
the nitrocellulose comprises from about 0.07% to about 0.18% by weight of the energetic composition;
the 2-nitrodiphenyl amine comprises from about 0.17% to about 0.22% by weight of the energetic composition;
the polyethylene glycol comprises about 6.2% by weight of the energetic composition;
the N-methyl-4-nitroaniline comprises at least about 1.0% of the energetic composition; and
the ammonium perchlorate, HMX, and aluminum together comprise at least about 75% by weight of the energetic composition.

21. The energetic composition of claim 20, further comprising a second nitrate ester selected from the group consisting of 1,2,4-butanetriol trinitrate, pentaerythritol tetranitrate, ethylene glycol dinitrate, diethylene glycol dinitrate, diglycerol tetranitrate, 1,2-propanediol dinitrate, trimethylolethane trinitrate, butyl-nitratoethylnitramine, triethyleneglycol dinitrate, and poly(glycidyl nitrate).

22. An energetic composition, comprising:
nitroglycerin; ammonium perchlorate, HMX, and aluminum;
a nitrate ester selected from the group consisting of 1,2,4-butanetriol trinitrate, pentaerythritol tetranitrate, ethylene glycol dinitrate, diethylene glycol dinitrate, diglycerol tetranitrate, 1,2-propanediol dinitrate, trimethylolethane trinitrate, butyl-nitratoethylnitramine, triethyleneglycol dinitrate, and poly(glycidyl nitrate); and
a stabilizer dissolved in each of the nitroglycerin and the nitrate ester;
wherein the ammonium perchlorate, HMX, and aluminum together comprise at least about 75% by weight of the energetic composition.

* * * * *

UNITED STATES PATENT AND TRADEMARK OFFICE
CERTIFICATE OF CORRECTION

PATENT NO. : 8,778,103 B2
APPLICATION NO. : 13/225159
DATED : July 15, 2014
INVENTOR(S) : John R. Moser, Jr., Richard L. Raun and David D. Shaw Page 1 of 1

It is certified that error appears in the above-identified patent and that said Letters Patent is hereby corrected as shown below:

In the specification:
COLUMN 15, LINE 32, change "DESMODUR ®" to --DESMODUR®--

In the claims:
CLAIM 21, COLUMN 18, LINE 48, change "butyl-nitratoethylnitramine," to --butyl-nitratoethylnitramine,--
CLAIM 22, COLUMN 18, LINE 57, change "butyl-nitratoethylnitramine," to --butyl-nitratoethylnitramine,--

Signed and Sealed this
Twentieth Day of October, 2015

Michelle K. Lee
*Director of the United States Patent and Trademark Office*